US012651986B2

(12) United States Patent
Taguchi

(10) Patent No.: US 12,651,986 B2
(45) Date of Patent: Jun. 9, 2026

(54) ACTUATOR DRIVING DEVICE AND METHOD OF CONTROLLING ACTUATOR DRIVING DEVICE

(71) Applicant: CANON KABUSHIKI KAISHA, Tokyo (JP)

(72) Inventor: Takayuki Taguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 18/480,838

(22) Filed: Oct. 4, 2023

(65) Prior Publication Data

US 2024/0120861 A1      Apr. 11, 2024

(30) Foreign Application Priority Data

Oct. 11, 2022      (JP) ................................. 2022-163319

(51) Int. Cl.
*H02P 7/025*          (2016.01)
*G02B 27/64*          (2006.01)
*G03B 5/00*           (2021.01)

(52) U.S. Cl.
CPC ............ *H02P 7/025* (2016.02); *G02B 27/646* (2013.01); *G03B 5/00* (2013.01); *G03B 2205/0007* (2013.01); *G03B 2205/0069* (2013.01)

(58) Field of Classification Search
CPC ......... H02P 7/025; G02B 27/646; G03B 5/00; G03B 2205/0007; G03B 2205/0069
See application file for complete search history.

(56) References Cited

U.S. PATENT DOCUMENTS

| | | | | |
|---|---|---|---|---|
| 2007/0053670 A1* | 3/2007 | Iwanaga | ............ | G11B 5/59605 |
| | | | | 388/811 |
| 2009/0096402 A1 | 4/2009 | Miyajima et al. | | |
| 2011/0291603 A1 | 12/2011 | Kura et al. | | |
| 2014/0368677 A1 | 12/2014 | Kobuna | | |
| 2020/0280275 A1 | 9/2020 | Tanaka et al. | | |

FOREIGN PATENT DOCUMENTS

| | | | |
|---|---|---|---|
| JP | 2012-75198 A | | 4/2012 |
| JP | 2015-2663 A | | 1/2015 |
| JP | 2015037374 A | * | 2/2015 |
| JP | 2015-130753 A | | 7/2015 |
| JP | 2017-90821 A | | 5/2017 |
| JP | 2021-44704 A | | 3/2021 |
| WO | 00/74222 W | | 12/2000 |

* cited by examiner

*Primary Examiner* — Bickey Dhakal
(74) *Attorney, Agent, or Firm* — VENABLE LLP

(57) ABSTRACT

An actuator driving device includes a driving coil that generates a driving force with first and second voltages; and a control unit, which sets one of the first and second voltages to a first pulse, sets the other one to a second pulse, and performs at least one of: a first control for modulating one pulse width of the first and second pulses with a change amount larger than that of the other pulse width so that a pulse width of ON time of the second pulse is within a pulse width of ON time of the first pulse; and a second control for modulating one pulse width of the first and second pulses with a change amount larger than that of the other pulse width so that the pulse width of the first pulse in ON time is within the pulse width of the second pulse in ON time.

21 Claims, 9 Drawing Sheets

ACTUATOR DRIVING DEVICE AND METHOD OF CONTROLLING ACTUATOR DRIVING DEVICE

BACKGROUND OF THE INVENTION

Field of the Invention

The present invention relates to an actuator driving device and a method of controlling the actuator driving device.

Description of the Related Art

In recent years, with an increase in the performance of an imaging apparatus, an imaging apparatus equipped with a shake correction mechanism has been increasing. As a method of shake correction, there is a method in which an actuator driving device is mounted and an optical lens is moved in a direction orthogonal to the optical axis, and there is a method in which an imaging element is moved in a direction orthogonal to the optical axis. As a method of moving the imaging element, a method of moving the imaging element and performing shake correction by a so-called voice coil motor method using a magnet and a driving coil is common. In this voice coil motor system, a pulse width modulation (PWM) control is widely used. In this PWM control, it is understood that magnetic field noise is generated by a current flowing through the driving coil, and an influence on the electronic device is generated.

In order to reduce the influence of magnetic field noise generated from a driving coil of an actuator driving device on an imaging element, a control method has been proposed in which a waveform of a current flowing through the driving coil is smoothed to a substantially trapezoidal waveform at the time of forward and reverse energization by PWM control, as described in Japanese Patent Application Laid-Open No. 2015-2663.

However, even if the driving current waveform is formed in a substantially trapezoidal shape by providing a short-circuit period in which the two output terminals are short-circuited as in the configuration described in Japanese Patent Application Laid-Open No. 2015-2663, the duty ratio of the driving voltage applied to each output terminal is 50% and the magnetic field becomes large. Therefore, with the configuration described in Japanese Patent Application Laid-Open No. 2015-2663, it is difficult to reduce the magnetic field noise generated from the driving coil with a simple configuration.

SUMMARY OF THE INVENTION

The present invention intends to provide an actuator driving device and a control method of the actuator driving device capable of reducing magnetic field noise generated from a driving coil with a simple configuration.

According to an aspect of the present invention, there is provided an actuator driving device including: a driving coil that has a first input terminal to which a first voltage is applied and a second input terminal to which a second voltage is applied, and generates a driving force for driving an actuator by applying the first voltage and the second voltage; and a control unit that controls the first voltage and the second voltage, wherein the control unit sets one of the first voltage and the second voltage to a first pulse, sets the other one of the first voltage and the second voltage to a second pulse, and performs at least one of the following: a first control for modulating one pulse width of the first pulse and the second pulse with a change amount larger than a change amount of the other pulse width of the first pulse and the second pulse so that a pulse width of the ON time of the second pulse is within a pulse width of the ON time of the first pulse; and a second control for modulating one pulse width of the first pulse and the second pulse with a change amount larger than the change amount of the other pulse width of the first pulse and the second pulse so that the pulse width of the first pulse in the ON time is within the pulse width of the second pulse in the ON time.

According to another aspect of the present invention, there is provided a method of controlling an actuator driving device that has a driving coil for having a first input terminal to which a first voltage is applied and a second input terminal to which a second voltage is applied and generating a driving force for driving an actuator by applying the first voltage and the second voltage, the method including: setting one of the first voltage and the second voltage is set to a first pulse and the other of the first voltage and the second voltage is set to a second pulse; and performing at least one of the following: a first control for modulating one pulse width of the first pulse and the second pulse with a change amount larger than a change amount of the other pulse width of the first pulse and the second pulse so that a pulse width of the ON time of the second pulse is within a pulse width of the ON time of the first pulse; and a second control for modulating one pulse width of the first pulse and the second pulse with a change amount larger than the change amount of the other pulse width of the first pulse and the second pulse so that the pulse width of the first pulse in the ON time is within the pulse width of the second pulse in the ON time.

Further features of the present invention will become apparent from the following description of exemplary embodiments with reference to the attached drawings.

BRIEF DESCRIPTION OF THE DRAWINGS

FIG. 1 is a schematic view illustrating an actuator driving device according to a first embodiment.

FIG. 9 is a schematic view illustrating an actuator driving device according to a third embodiment.

DESCRIPTION OF THE EMBODIMENTS

Figure 2:
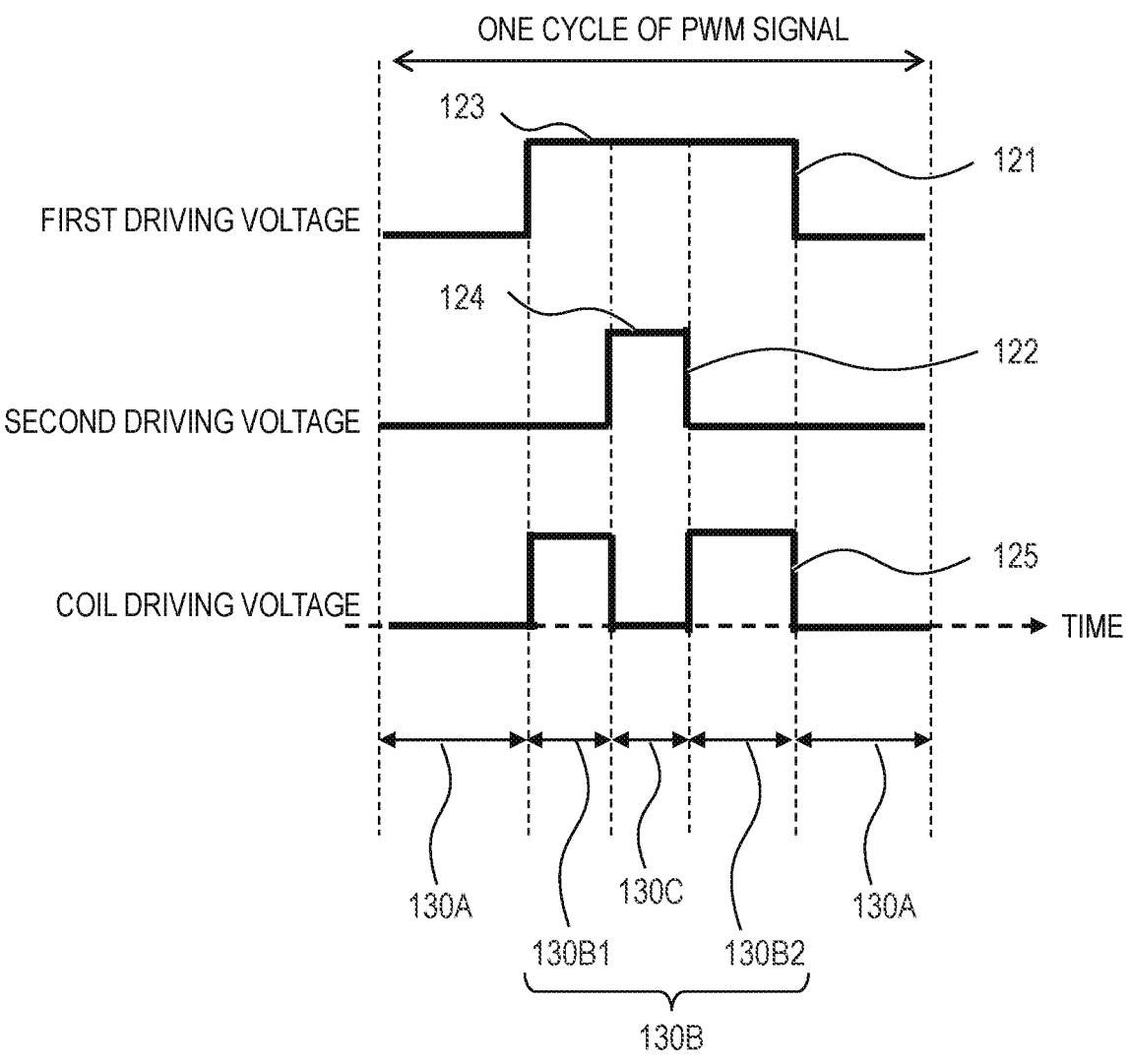
FIG. 2 is a diagram illustrating a coil driving voltage for driving an actuator by the actuator driving device according to the first embodiment.

Embodiments of the present invention will now be described with reference to the drawings. However, the embodiments described below are some embodiments of the present invention and are not limited thereto. Components denoted by common reference numerals will not be described as appropriate.

First Embodiment

Figure 1:
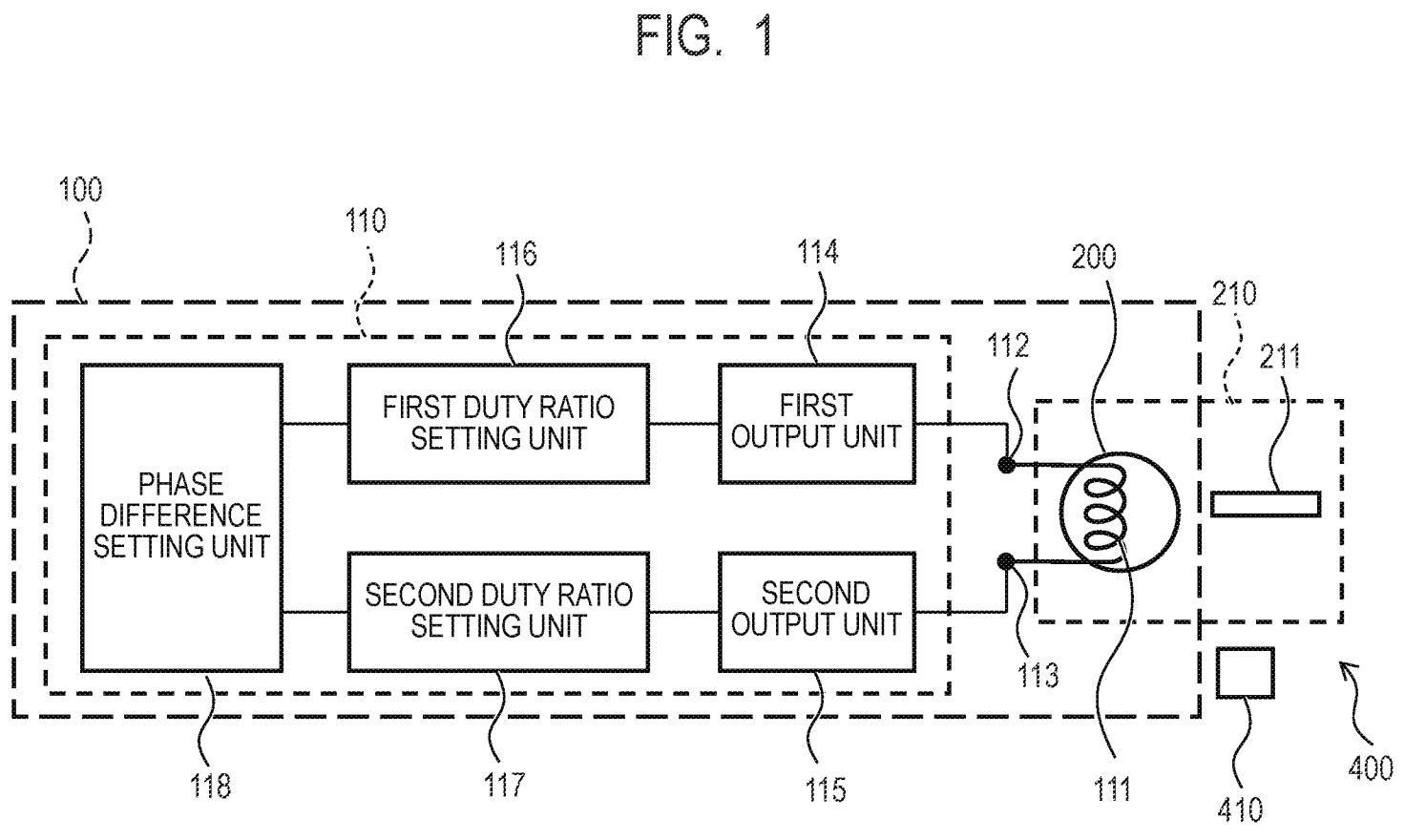

An actuator driving device and a control method of the actuator driving device according to a first embodiment of the present invention will be described with reference to FIGS. 1 to 7.

First, the configuration of the actuator driving device according to the present embodiment will be described with reference to FIG. 1. FIG. 1 is a schematic diagram illustrating an actuator driving device 100 according to the present embodiment. In the present embodiment, a case where the actuator driving device constitutes a shake correction mechanism used in an electronic apparatus (imaging apparatus) such as a digital still camera or a digital video camera will be described as an example. In addition, for example, the actuator driving device can be used for a configuration that drives optical elements for shake correction in an optical device such as an interchangeable lens mounted on an interchangeable lens type camera. A voice coil motor is typical as an actuator used in the shake correction mechanism. The voice coil motor is a moving coil type actuator and is a linear motor. The actuator driving device according to the present embodiment is not limited to the case of configuring the shake correction mechanism and can be used for driving the actuator in various devices. The motor used in the actuator driving device is not limited to a linear motor, the motor may be a rotary motor. The motor is not limited to a moving coil type actuator, the motor may be a moving magnet type actuator. For example, the actuator driving device can be used for driving a motor that drives various mechanical elements (such as rollers and gears) included in a printing apparatus (image forming apparatus) such as an electrophotographic printer or an inkjet printer. Alternatively, the actuator driving device can be used for driving mechanical elements (arms and stages) included in industrial equipment such as a robot and a transfer device.

As illustrated in FIG. 1, the actuator driving device 100 according to the present embodiment includes a driving circuit 110 and a driving coil 111. The driving circuit 110 includes a first output unit 114, a second output unit 115, a first duty ratio setting unit 116, a second duty ratio setting unit 117, and a phase difference setting unit 118. The driving coil 111 is provided with a first input terminal 112 at one end and a second input terminal 113 at the other end.

The driving coil 111 is sandwiched between magnets (not illustrated), and is disposed in a magnetic field formed by the magnets. When a coil driving voltage is applied from the driving circuit 110, a coil driving current flows through the driving coil 111. When the coil driving current flows in the driving coil 111, a force according to Fleming's left-hand rule is generated. The actuator driving device 100 can drive the actuator 200 to be driven using a force generated in the driving coil 111 as a driving force. Although the driving coil 111 is sandwiched between magnets, it is sufficient that a magnetic field necessary for driving reaches the driving coil 111 from the magnets. Therefore, the magnet may be disposed only on either side of the driving coil 111. Further, although the force generated in the driving coil 111 is used as the driving force, the driving coil 111 may be fixed, and the actuator 200 to be driven may be driven using the force generated in the magnet as the driving force.

The actuator 200 is incorporated in a movable unit 210 movable in a predetermined direction. The movable unit 210 holds the imaging element 211. The imaging element 211 is provided in an imaging device that captures an image and is an element that photoelectrically converts a light flux collected by an imaging optical system after passing through the imaging optical system. Therefore, by driving the actuator 200, the imaging element 211 can be moved together with the movable unit 210. In this way, the actuator driving device 100 constitutes the shake correction mechanism 400 that reduces the shake of the captured image due to the photographer's shake or the like by moving the imaging element 211 in response to the driving the actuator 200.

The shake correction mechanism 400 includes a magnetic sensor 410. The magnetic sensor 410 can detect the position of the movable unit 210 that moves in accordance with driving the actuator 200 by using a magnetic circuit. As the magnetic sensor 410, for example, a hall element or the like can be used. As means for detecting the position of the movable unit 210, various position sensors may be used instead of the magnetic sensor 410. The actuator driving device 100 can perform feedback control by using a signal that corresponds to the position of the movable unit 210 and is output from the magnetic sensor 410. The actuator driving device 100 control the coil driving current to flow through the driving coil 111 based on the value of the signal from the magnetic sensor 410 and thereby can control the direction related to the driving of the actuator 200.

Note that, a plurality of actuators 200 may be mounted. In this case, by controlling each of the plurality of actuators 200 by one or a plurality of actuator driving device 100, it is possible to move the movable unit 210 in any direction, such as not only to move the movable unit 210 in a straight direction but also to move and rotate the movable unit 210 in a rotating direction. The specific configuration of the actuator 200 and the shake correction mechanism 400 using the actuator 200 are not particularly limited, and any configuration can be adopted.

The first input terminal 112 and the second input terminal 113 that are respectively provided at one end and the other end of the driving coil 111 are terminal portions for applying a driving voltage to the driving coil 111. The driving coil 111 is connected to a driving circuit 110 as a control unit that controls a driving voltage applied to the driving coil 111. That is, the first output unit 114 of the driving circuit 110 is connected to the first input terminal 112. The second output unit 115 of the driving circuit 110 is connected to the second input terminal 113.

The first output unit 114 is an output unit that outputs a first driving voltage 121 (see FIG. 2) which is a first voltage applied to the first input terminal 112. The second output unit 115 is an output unit that outputs a second driving voltage 122 (see FIG. 2) which is a second voltage applied to the second input terminal 113. The first driving voltage 121 and the second driving voltage 122 are voltages of pulse width modulation (PWM) signals, each of which is set to be ON or OFF time according to a set a duty ratio. The driving circuit 110 controls the driving force for driving the actuator 200 by changing the pulse widths of the first driving voltage 121 and the second driving voltage 122 which are PWM signals applied to the driving coil 111 by the first output unit 114 and the second output unit 115.

Each of the first output unit 114 and the second output unit 115 is, for example, a driver IC (Integrated Circuit) used for driving control of a motor or the like and are specifically configured by an H-bridge circuit used for driving control of a motor or the like. Although it assumed that the first output unit 114 and the second output unit 115 are configured by the H-bridge circuit, the configuration of the circuits and the like of the first output unit 114 and the second output unit 115 is not limited as long as the driving voltage described later can be output. The first duty ratio setting unit 116 is connected to the first output unit 114. The second duty ratio setting unit 117 is connected to the second output unit 115.

The first duty ratio setting unit 116 is a setting unit for setting a duty ratio of the first driving voltage 121 which is a PWM signal output from the first output unit 114, that is, a pulse width setting unit for setting a pulse width of the first driving voltage 121. The second duty ratio setting unit 117 is a setting unit for setting a duty ratio of the second driving voltage 122 which is a PWM signal output from the second output unit 115, that is, a pulse width setting unit for setting a pulse width of the second driving voltage 122. The phase difference setting unit 118 is connected to the first duty ratio setting unit 116 and the second duty ratio setting unit 117.

The phase difference setting unit 118 sets a phase difference between the first driving voltage 121 output from the first output unit 114 and the second driving voltage 122 output from the second output unit 115. The phase difference setting unit 118 sets the phase difference between the first driving voltage 121 and the second driving voltage 122 via the first duty ratio setting unit 116 and the second duty ratio setting unit 117.

Next, the details of the coil driving voltage, which is a driving voltage for driving the actuator 200 by the actuator driving device 100 according to the present embodiment, will be described with reference to FIG. 2. FIG. 2 is a diagram illustrating the coil driving voltage for driving the actuator 200 by the actuator driving device 100.

As illustrated in FIG. 2, the driving circuit 110 applies the first driving voltage 121 and the second driving voltage 122 to the first input terminal 112 and the second input terminal 113 provided in the driving coil 111 by the first output unit 114 and the second output unit 115, respectively. Each of the first driving voltage 121 and the second driving voltage 122 are PWM signals. The cycle of the first driving voltage 121 and the cycle of the second driving voltage 122 are the same. Since the drive of the actuator 200 is determined by the voltage or current applied to the driving coil 111, the coil driving voltage 125 that determines the drive of the actuator 200 is a potential difference generated across the driving coil 111. That is, the coil driving voltage 125 is the difference between the first driving voltage 121 and the second driving voltage 122.

The driving circuit 110 functions as a control unit that controls the first driving voltage 121 and the second driving voltage 122. The driving circuit 110 changes the pulse widths of the waveforms of the first driving voltage 121 and the second driving voltage 122, which are PWM signals, according to the driving of the actuator 200, and performs different control between the first driving voltage 121 and the second driving voltage 122. Specifically, the driving circuit 110 sets and controls one of the first driving voltage 121 and the second driving voltage 122 to a modulation pulse 123 for modulating the pulse width, and sets and controls the other to a fixed pulse 124 for fixing the pulse width. Accordingly, the driving circuit 110 controls the driving force of the actuator 200 by pulse width modulation of the modulation pulse 123. Although FIG. 2 illustrates the case where the first driving voltage 121 is the modulation pulse 123 and the second driving voltage 122 is the fixed pulse 124, there could be a case where the first driving voltage 121 is the fixed pulse 124 and the second driving voltage 122 is the modulation pulse 123.

As pulse width modulation of the modulation pulse 123, the driving circuit 110 can perform control of widening the pulse width of the modulation pulse 123 or narrowing the pulse width from both sides with reference to the center of the pulse of the modulation pulse 123.

Further, the driving circuit 110 can set the modulation pulse 123 and the fixed pulse 124 such that the pulse width of the ON time of the fixed pulse 124 is within the pulse width of the ON time of the modulation pulse 123. Specifically, the driving circuit 110 can set the pulse width of the modulation pulse 123, the pulse width of the fixed pulse 124, and the phase difference between the modulation pulse 123 and the fixed pulse 124. The driving circuit 110 can perform these settings by the first duty ratio setting unit 116, the second duty ratio setting unit 117, and the phase difference setting unit 118. In this way, by performing control to keep the modulation pulse 123 on at least when the fixed pulse 124 is ON, it is not necessary to change the pulse width and the phase relationship of the fixed pulse 124, with reference to the center of the pulse of the modulation pulse 123. By controlling the modulation pulse 123 and the fixed pulse 124 in this manner, it is possible to perform simple control of always performing only constant output for the fixed pulse 124.

By configuring the first driving voltage 121 and the second driving voltage 122 as the modulation pulse 123 and the fixed pulse 124 as described above, the coil driving voltage 125 can have a waveform suitable for reducing magnetic field noise. A mechanism of reducing magnetic field noise by the waveform of the coil driving voltage 125 will be described later.

Although, in the above description, the driving circuit 110 controls the pulse width of the modulation pulse 123 to widen or narrow the pulse width from both sides with reference to the pulse center, the present invention is not limited to thereto. Instead of this control, the driving circuit 110 may perform control of modulating the pulse width of the modulation pulse 123 with reference to the rising edge of the pulse. At this time, the driving circuit 110 can set the phase difference of the fixed pulse 124 by the phase difference setting unit 118 such that the pulse width of the ON time of the fixed pulse 124 is within the pulse width of the ON time of the modulation pulse 123.

In the driving circuit 110, the terminal for outputting the modulation pulse 123 and the terminal for outputting the fixed pulse 124 can be configured to be switched to each other. That is, the driving circuit 110 can be configured to have a function of switching the modulation pulse 123 and the fixed pulse 124 set as the first driving voltage 121 and the second driving voltage 122 to each other. In this case, for example, when the first driving voltage 121 is the modulation pulse 123 and the second driving voltage 122 is the fixed pulse 124, the first driving voltage 121 can be switched to the fixed pulse 124 and the second driving voltage 122 can be switched to the modulation pulse 123 by switching the terminals. The driving circuit 110 can perform these switching at the timing when the pulse width of the modulation pulse 123 is equal to the pulse width of the fixed pulse 124. Specifically, for example, the driving circuit 110 can perform these switching at the timing when the pulse width of the modulation pulse 123 becomes smaller and is equal to the pulse width of the fixed pulse 124. By switching both pulses, the modulation pulse 123 and the fixed pulse 124 can be switched while maintaining change with high linearity about the driving force of the actuator 200 due to pulse width modulation. By switching the modulation pulse 123 and the fixed pulse 124 each other, the direction of the current flowing through the driving coil 111 can be switched in the reverse direction, and the direction of the driving force applied to the actuator 200 can be switched in the reverse direction.

The modulation pulse 123 and the fixed pulse 124 can be switched within a range in which there is no problem in the operation of the actuator 200. For example, as long as a range in which there is no problem in the operation of the actuator 200, the driving circuit 110 may be configured to switch the modulation pulse 123 and the fixed pulse 124 to each other from a state where there is a difference between the pulse width of the modulation pulse 123 and the pulse width of the fixed pulse 124.

The function of switching the modulation pulse 123 and the fixed pulse 124 to each other in the driving circuit 110 is for switching the driving force of the actuator 200 in the reverse direction. Therefore, when the direction of the driving force of the actuator 200 is only one direction, the driving circuit 110 may not have a function of switching between the modulation pulse 123 and the fixed pulse 124.

Next, the details of the coil driving voltage 125 will be described with reference to FIG. 2, taking as an example the case where the first driving voltage 121 is the modulation pulse 123 and the second driving voltage 122 is the fixed pulse 124. In the case where the first driving voltage 121 is the fixed pulse 124 and the second driving voltage 122 is the modulation pulse 123, the applied pulses are reversed, but the relationship between the modulation pulse 123 and the fixed pulse 124 remains the same, and thus description thereof is omitted. Further, the coil driving voltage 125 is a pulse waveform, and in FIG. 2, the coil driving voltage 125 is illustrated by a square wave whose rising time and falling time are significantly short. However, the waveform of the coil driving voltage 125 is not limited thereto. The waveform of the coil driving voltage 125 may be a waveform having a constant rising time or a constant falling time depending on the specifications of the driving circuit 110 and the driver IC that outputs the first driving voltage 121 and the second driving voltage 122.

The driving circuit 110 can modulate a pulse width corresponding to a time during which the voltage is ON by applying a two-valued voltage of ON and OFF as the first driving voltage 121 and the second driving voltage 122, respectively. Accordingly, the coil driving voltage 125 includes a period 130A, a period 130B, and a period 130C in one cycle of the PWM signal. In the periods 130A, 130B, and 130C, the ON/OFF states of the first driving voltage 121 and the second driving voltage 122 are different from each other.

The period 130A is a period in which the first driving voltage 121 is OFF and the second driving voltage 122 is OFF. The period 130B is a period in which the first driving voltage 121 is ON and the second driving voltage 122 is OFF. The period 130C is a period in which the first driving voltage 121 is ON and the second driving voltage 122 is ON.

The driving circuit 110 controls the modulation pulse 123 and the fixed pulse 124 such that the pulse width of the ON time of the fixed pulse 124 is within the pulse width of the ON time of the modulation pulse 123. Therefore, the period 130C in which the first driving voltage 121 is ON and the second driving voltage 122 is also ON is equivalent to the pulse width of the fixed pulse 124. In one cycle of the PWM signal, the period 130B is composed of two periods, that is, a period 130B1 and a period 130B2 positioned so as to sandwich the period 130C before and after the period 130C in a time series.

In addition, there is no period in which the first driving voltage 121 is OFF and the second driving voltage 122 is ON in the coil driving voltage 125. As a result, the coil driving voltage 125 is configured such that there is no period during which a reverse current flows through the driving coil 111 in one cycle of the PWM signal.

As described above, the driving circuit 110 combines the modulation pulse 123 and the fixed pulse 124 to control the coil driving voltage 125 to have a waveform including two pulses during one cycle of the PWM signal. By controlling the coil driving voltage 125 in this manner, the magnetic noise generated from the driving coil 111 can be dispersed to a higher frequency in the frequency component, and the influence of the magnetic noise reaching the imaging element 211 can be reduced. The effect of reducing magnetic noise will be described in detail later.

Figure 3A:
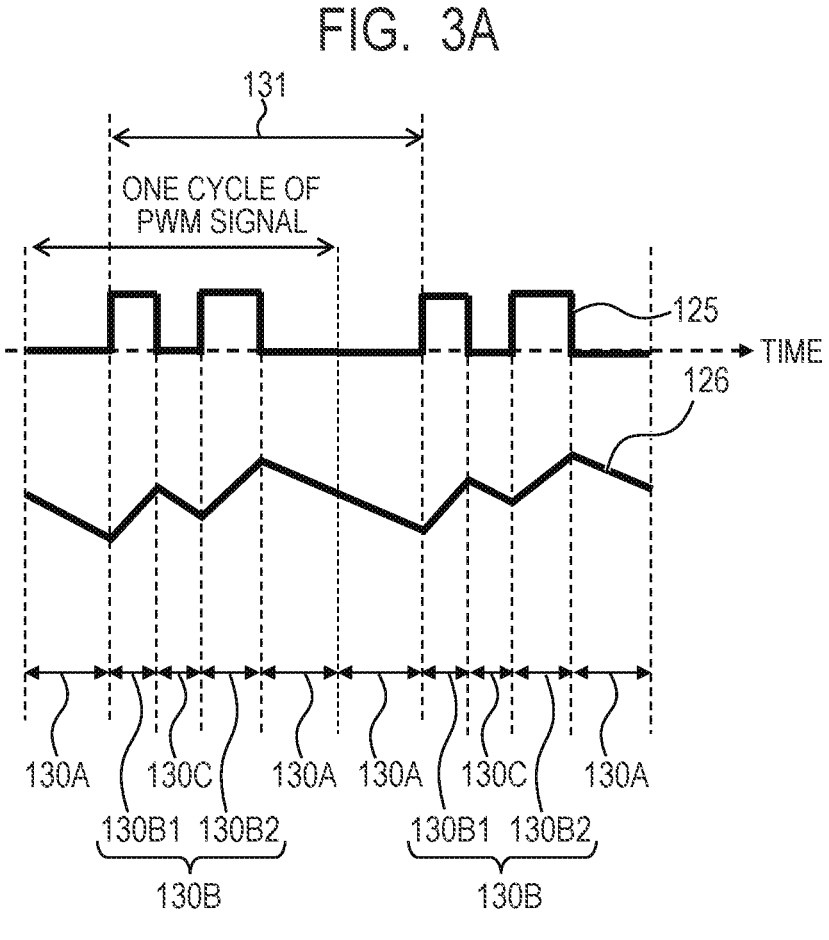
FIG. 3A is a diagram illustrating a coil driving voltage and a coil driving current by the actuator driving device according to the first embodiment.

Next, the coil driving current 126 flowing through the driving coil 111 in each of the periods 130A, 130B, and 130C will be described with reference to FIGS. 3A and 3B. FIG. 3A is a diagram schematically illustrating an example of waveforms of two cycles of the coil driving voltage 125 illustrated in FIG. 2 and the coil driving current 126 flowing during the two cycles by the actuator driving device 100 according to the present embodiment. For comparison, FIG. 3B is a diagram schematically illustrating an example of waveforms of two cycles of the coil driving voltage 127 and the coil driving current 128 flowing during the two cycles according to a general PWM signal.

The coil driving current 126 illustrated in FIG. 3A means a current flowing through the driving coil 111. The driving coil 111 has an inductance value electrically. Accordingly, in the driving coil 111, an electromotive force that prevents an increase or decrease in current is generated due to a change in the ON/OFF state of the coil driving voltage 125 applied to the driving coil 111 by the driving circuit 110. By this electromotive force, in the period 130B consisting of the period 130B1 and the period 130B2, the coil driving current 126 flowing from the first input terminal 112 to the second input terminal 113 indicates a slope gradually increasing. In the periods 130A and 130C, conversely, the coil driving current 126 flowing from the first input terminal 112 to the second input terminal 113 indicates a slope gradually decreasing.

As described in the description of the coil driving voltage 125, there is no period during which a current flows from the second input terminal 113 to the first input terminal 112 in one cycle of the PWM signal. Accordingly, the coil driving current 126 is configured such that a current flows from the first input terminal 112 to the second input terminal 113 in all of the periods 130A, 130B, and 130C. The coil driving current 126 indicates a slope increasing or decreasing in the periods 130A, 130B, and 130C. By configuring the coil driving current 126 in this manner, the driving force of the actuator 200 is avoided from being reduced by a force in the reverse direction during one cycle of the PWM signal. As can be seen from the period 131 for one cycle with the beginning of the period 130B1 as a reference, a waveform composed of two triangular waves is formed in the coil driving current 126 during one cycle.

Figure 3B:
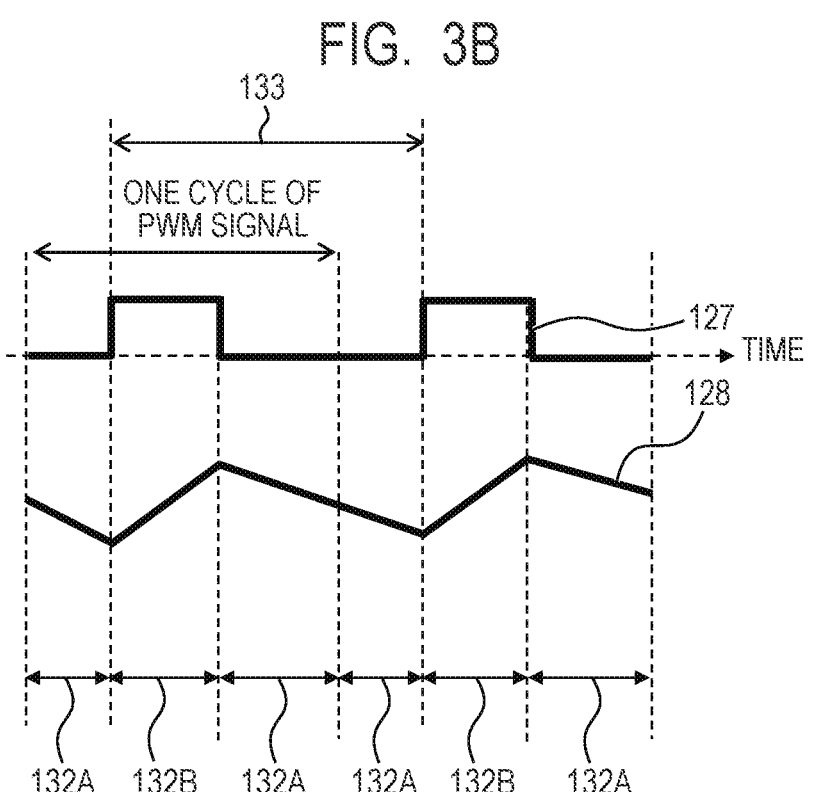
FIG. 3B is a diagram illustrating a coil driving voltage and a coil driving current by the actuator driving device according to the first embodiment.

On the other hand, FIG. 3B illustrates a coil driving voltage 127 and a coil driving current 128 by a general PWM signal. The coil driving voltage 127 has one pulse during one cycle of the PWM signal. Similarly to the coil driving current 126, the coil driving current 128 indicates a slope in which the current gradually decreases in a period 132A in which the coil driving voltage 127 is OFF, and indicates a slope in which the current gradually increases in a period 132B in which the coil driving voltage 127 is ON. As can be seen from the period 133 for one cycle whose reference is the start of the period 132B, a waveform composed of one triangular wave is formed in the coil driving current 128 during one cycle. Although the number of pulses formed during one period of the coil driving voltage 125 and the number of pulses formed during one cycle of the coil driving voltage 127 are different, the same driving force can be generated by the actuator 200 if the ON time of the pulses included during one cycle of the PWM signal is the same.

Therefore, according to FIGS. 3A and 3B, if the periods 130B and 132B have the same pulse width, the same driving force can be generated by the actuator 200. The current change caused by the ON/OFF change of the coil driving voltage 125 and the coil driving voltage 127 in the coil driving current 126 and the coil driving current 128 can be obtained by the resistance value R and the inductance value L of the driving coil 111 and the driving frequency of the PWM signal. This can be obtained from an RL series circuit composed of a general inductance value L and a resistance value R.

In the present embodiment, for example, the driving frequency of the PWM signal can be set to about several tens of kHz to several hundreds of kHz, the resistance value of the driving coil 111 can be set to 10Ω, and the inductance value of the driving coil 111 in the driving frequency band can be set to about 100 μH. According to such a condition, the current change caused by the ON/OFF change of the coil driving voltage 125 and the coil driving voltage 127 in the coil driving current 126 and the coil driving current 128 becomes approximately linear. Therefore, in the present embodiment, the coil driving current 126 is a triangular wave. However, the waveform of the coil driving current 126 is not limited thereto. The driving frequency of the PWM signal, the resistance value of the driving coil 111, and the inductance value of the driving coil 111 are different from those in the above case, the current change of the coil driving current 126 becomes non-linear, thereby a waveform separated from an ideal triangular wave may be formed in the coil driving current 126.

Figure 4:
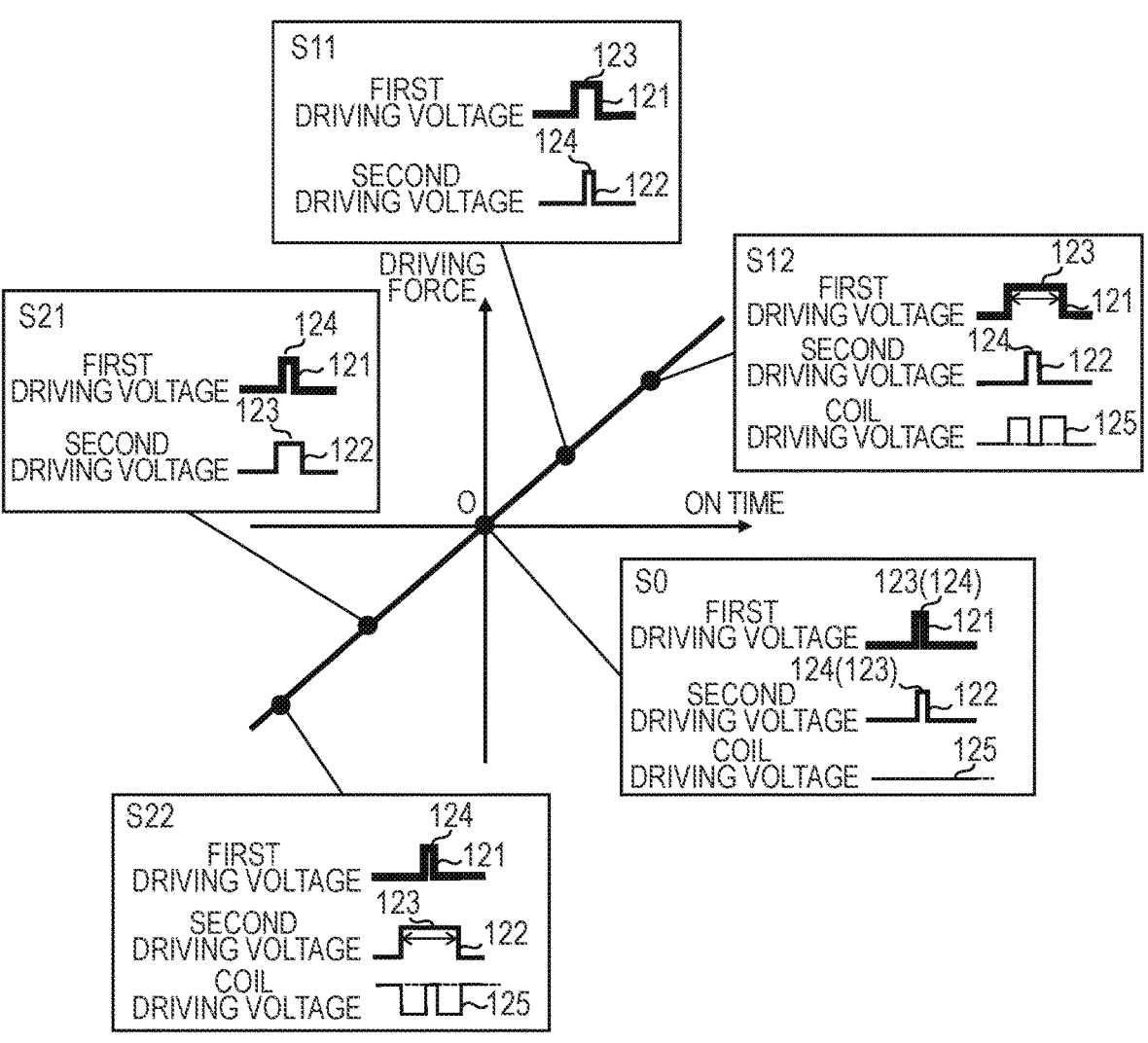
FIG. 4 is a graph schematically illustrating a relationship between a driving force generated in a driving coil and an ON time which is a time width during which a coil driving voltage is ON in one cycle of a PWM signal.

Here, the relationship between the driving force generated in the driving coil 111 and the ON time of the coil driving voltage 125, and the corresponding waveforms of the first driving voltage 121, the second driving voltage 122, and the coil driving voltage 125 will be described with reference to FIG. 4. FIG. 4 is a graph schematically illustrating the relationship between the driving force generated in the driving coil 111 and the ON time, which is the time width during which the coil driving voltage 125 is ON in one cycle of the PWM signal. In the graph illustrated in FIG. 4, the horizontal axis indicates the ON time, and the ON time is positive when the pulse width of the first driving voltage 121 is larger than the pulse width of the second driving voltage 122, and the ON time is negative when the pulse width of the second driving voltage 122 is larger than the pulse width of the first driving voltage 121. The vertical axis indicates the driving force, and the driving force is positive when the pulse width of the first driving voltage 121 is larger than the pulse width of the second driving voltage 122, and the driving force is negative when the pulse width of the second driving voltage 122 is larger than the pulse width of the first driving voltage 121. The states S0, S11, S12, S21, and S22 of the waveforms of the first driving voltage 121, the second driving voltage 122, and the coil driving voltage 125 are also illustrated in the graph.

As illustrated in FIG. 4, the driving force is deformed linearly, for example, according to the variation of the ON time. On the side where the ON time is positive, the first driving voltage 121 is the modulation pulse 123, and the second driving voltage 122 is the fixed pulse 124. On the other hand, on the side where the ON time is negative, the first driving voltage 121 is a fixed pulse 124, and the second driving voltage 122 is a modulation pulse 123. At the origin O where the ON time is zero, the first driving voltage 121 and the second driving voltage 122 can be set to one among the modulation pulse 123 and the fixed pulse 124 or the other among them, respectively. In these cases, the center of the pulse width of the modulation pulse 123 and the center of the pulse width of the fixed pulse 124 always overlap each other.

The state S0 is a state at the origin O. In the state S0, the duty ratios [%] of the first driving voltage 121 set as one among the modulation pulse 123 and the fixed pulse 124 and the second driving voltage 122 set as the other among them are set to 10%, for example, and are equal. Therefore, the driving force is not generated in the state S0.

The states S11 and S12 are states when the first driving voltage 121 is the modulation pulse 123 and the second driving voltage 122 is the fixed pulse 124 having a duty ratio [%] of 10%, for example. The pulse width of the modulation pulse 123 is wider in the state S12 than in the state S11. Between the states S0 and S12, as illustrated in the states S11 and S12, the magnitude of the driving force becomes larger as the pulse width of the modulation pulse 123 becomes wider.

On the other hand, the states S21 and S22 are states when the first driving voltage 121 is a fixed pulse 124 having a duty ratio [%] of 10%, for example, and the second driving voltage 122 is a modulation pulse 123. The pulse width of the modulation pulse 123 is wider in the state S22 than in the state S21. Between the states S0 and S22, as illustrated in the states S21 and S22, the magnitude of the driving force whose direction is opposite to that in states S11 and S22 becomes larger as the pulse width of the modulation pulse 123 becomes wider.

The driving circuit 110 can control the magnitude of the driving force by changing the pulse width of the modulation pulse 123 between the state S0 and the state S12 in which the first driving voltage 121 is the modulation pulse 123 and the second driving voltage 122 is the fixed pulse 124. Further, the driving circuit 110 can control the magnitude of the driving force by changing the pulse width of the modulation pulse 123 between the state S0 and the state S22 in which the first driving voltage 121 is the fixed pulse 124 and the second driving voltage 122 is the modulation pulse 123. In these cases, the fixed pulse 124 may be a pulse whose pulse width changes. However, the driving circuit 110 modulates the pulse width of the modulation pulse 123 with a change amount larger than the change amount of the pulse width of the pulse whose pulse width changes instead of the fixed pulse 124. Here, the change amount is an absolute value.

That is, the driving circuit 110 can switch between a first control and a second control by performing the first control between the state S0 and the state S12 and performing the second control between the state S0 and the state S22. As the first control, the driving circuit 110 modulates the pulse width of the first driving voltage 121 with a change amount larger than the change amount of the pulse width of the second driving voltage 122 such that the pulse width of the ON time of the second driving voltage 122 is within the pulse width of the ON time of the first driving voltage 121. Further, as the second control, the driving circuit 110 modulates the pulse width of the second driving voltage 122 with a change amount larger than the change amount of the pulse width of the first driving voltage 121 such that the pulse width of the first driving voltage 121 in the ON time is within the pulse width of the second driving voltage 122 in the ON time.

Further, in the first control, the driving circuit 110 can set the first driving voltage 121 and the second pulse such that the timing of the center of the pulse of the first driving voltage 121 is within the pulse width of the second driving voltage 122. Further, in the second control, the driving circuit 110 can set the first driving voltage 121 and the second driving voltage 122 such that the timing of the center of the pulse of the second driving voltage 122 is within the pulse width of the first driving voltage 121. Further, the driving circuit 110 can set the first driving voltage 121 and the second driving voltage 122 such that the timing at the center of the first driving voltage 121 and the timing at the center of the first driving voltage 121 overlap each other in at least one of the first control and the second control.

Further, at the timing of switching between the first control and the second control, the driving circuit 110 can set the duty ratio of the pulse widths of the first driving voltage 121 and the second driving voltage 122 within 4 to 35%.

Next, magnetic field noise generated by the actuator 200 and a mechanism by which the magnetic field noise reaches the imaging element 211 and causes a disturbance of the image captured by the imaging element 211 will be described. When the PWM signal that periodically changes flows through the driving coil 111, magnetic field noise is generated from the driving coil 111. When the magnetic field noise reaches the imaging element 211, an image captured by the imaging element 211 is disturbed, and, for example, horizontal stripe-shaped image noise is generated. The magnetic field noise generated from the driving coil 111 by the PWM signal has a plurality of frequency components corresponding to the shape of the waveform. The imaging element 211 also includes an operation frequency accompanying the operation of the imaging element 211, such as a cycle in which light is read and a transfer cycle in which read light information is transferred to a circuit. For this reason, the disorder of the image varies depending on the plurality of frequency components of the image noise. Specifically, the distance between the horizontal stripes and the shading of the horizontal stripes due to the image noise change. Accordingly, by considering each frequency component separately and suppressing the frequency component of the magnetic field noise having a large influence as the image noise to a small extent, the magnetic field noise affecting the imaging element 211 can be suppressed and the image disturbance can be reduced.

Figures 5A, 5B:
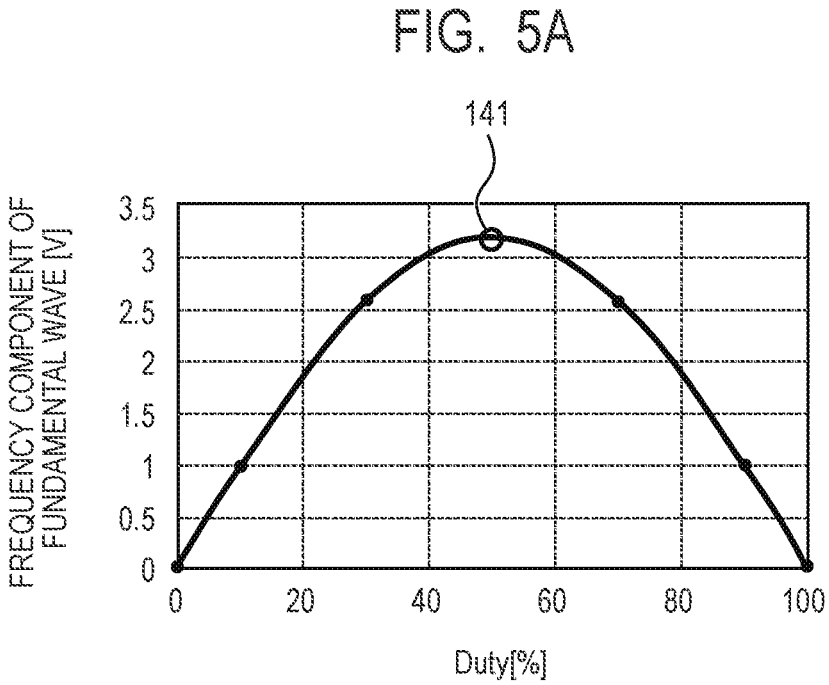
FIG. 5A is a graph illustrating a relationship between the duty ratio of the coil driving voltage and the frequency component of fundamental wave by the actuator driving device.
FIG. 5B is a graph illustrating a relationship between the duty ratio of the coil driving voltage and the frequency component of fundamental wave by the actuator driving device.

The actuator driving device 100 according to the present embodiment forms two pulses during one cycle of the PWM signal in the coil driving voltage 125, thereby reduce the influence of magnetic noise reaching the imaging element 211. The effect of the magnetic field noise will be described. FIGS. 5A and 5B illustrate characteristics of frequency component of fundamental wave of the PWM signal that change with a drive change of the actuator 200. Here, the term "drive change" refers to a change in the duty ratio (Duty) [%] of the pulse width in the PWM signal. When a general PWM signal as illustrated in FIG. 3B is considered separately for each frequency component based on a change in the Duty [%], it is generally understood that a voltage which is maximized except for a DC component is a frequency component of fundamental wave when the Duty [%] is 50%. Therefore, in order to compare the effects of the present embodiment, FIGS. 5A and 5B illustrate changes in the frequency component of fundamental wave accompanying changes in the Duty [%]. FIG. 5A illustrates a change in the frequency component of fundamental wave when the Duty of the coil driving voltage 127 of the general PWM signal illustrated in FIG. 3B is changed.

FIG. 5B illustrates a change in the frequency component of fundamental wave when the Duty [%] of the modulation pulse 123 is changed under a condition in which the center of the pulse width of the modulation pulse 123 and the center of the pulse width of the fixed pulse 124 always overlap each other. In FIG. 5B, the second driving voltage 122 illustrated in FIG. 2 is a fixed pulse 124 in which the Duty [%] is fixed, and the first driving voltage 121 illustrated in FIG. 2 is a modulation pulse 123 in which the Duty [%] is changed. In the graphs illustrated in FIGS. 5A and 5B, the horizontal axis indicates the Duty [%], and the vertical axis indicates the magnitude of the frequency component of fundamental wave of the PWM signal of the waveform. Note that the Duty [%] illustrated in FIG. 5B is a period 130B for one cycle of the PWM signal, and a period 130B is a sum of the periods 130B1 and 130B2. In FIGS. 5A and 5B, the amplitudes of the coil driving voltage 125 and the coil driving voltage 127 are 5 [V], respectively.

As illustrated in FIG. 5A, the frequency component of fundamental wave of the coil driving voltage 127, which is a general PWM signal, is minimized when the Duty is 0% and the Duty is 100%. When the Duty is 50 [%], the frequency component of fundamental wave becomes maximum as denoted by a point 141, and the maximum value thereof becomes 3.18 [V].

On the other hand, in the case of the present embodiment, as illustrated in FIG. 5B, when the Duty is 35 [%], the frequency component of fundamental wave is maximized as illustrated by a point 142, and the maximum value thereof is 1.39 [V]. Therefore, according to the present embodiment, the largest frequency component of fundamental wave among the frequency components of the coil driving voltage 125 can be reduced. Therefore, according to the present embodiment, the magnetic field noise of the frequency component of fundamental wave generated from the driving coil 111 can be reduced, and the image disturbance generated in the image captured by the imaging element 211 can be reduced.

Figure 6:
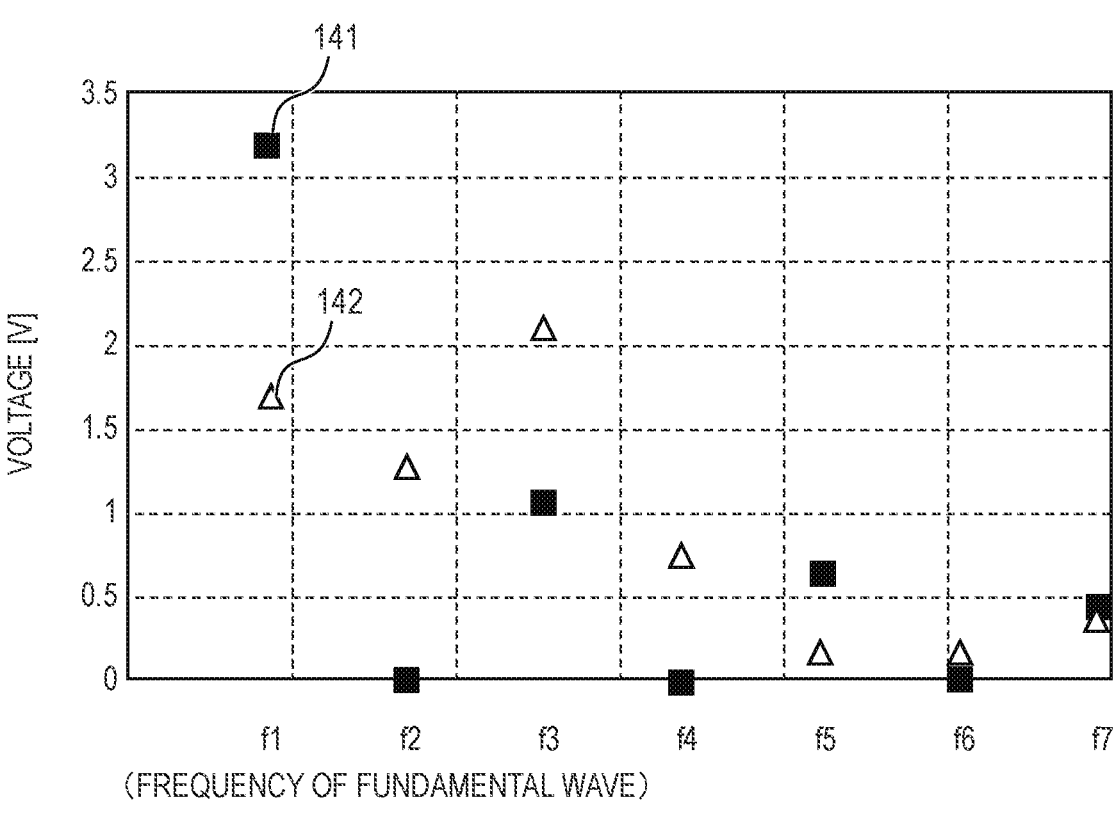
FIG. 6 is a graph illustrating a relationship between a fixed pulse width and a frequency characteristic of a waveform in a driving voltage of the actuator driving device according to the first embodiment.

Next, as illustrated in FIGS. 5A and 5B, a mechanism for reducing frequency component of fundamental wave of magnetic field noise by applying the present embodiment will be described with reference to FIG. 6. FIG. 6 is a graph illustrating frequency components of waveforms forming a point 141 and a point 142 at which frequency component of fundamental wave of the coil driving voltages 127 and 125 illustrated in FIGS. 5A and 5B are maximized. In FIG. 6, a black square (■) denotes a frequency component of the coil driving voltage 127 which is a general PWM signal, and a white triangle (A) denotes a frequency component of the coil driving voltage 125 according to the present embodiment. In FIG. 6, the fundamental wave and the second harmonic to the seventh harmonic of the PWM signal are illustrated with the horizontal axis as a frequency axis. In FIG. 6, "f1" indicates the frequency of fundamental wave, and "f2" to "f7" indicate the second harmonic to the seventh harmonic, respectively. The vertical axis indicates the magnitude of the voltage for each frequency. The reason why the horizontal axis indicates the fundamental wave and the harmonic wave of an integer multiple of the fundamental wave is that the signal of the repetition cycle can be decomposed into the fundamental wave component and the harmonic wave of an integer multiple of the fundamental wave by a generally known principle.

It can be seen from FIG. 6 that the coil driving voltage 127 denoted by the black square (■) is composed of a frequency component of fundamental wave that becomes the maximum and an odd multiple harmonic component of the fundamental wave that decreases with an increase in frequency when the Duty at which the voltage becomes the maximum except for the DC component is 50%. This is because the coil driving voltage 127 is a waveform having one pulse in one cycle as illustrated in FIG. 3B, and the voltage level of the waveform is concentrated on the frequency of fundamental wave and the odd multiple harmonic of the fundamental wave. The detailed principle that the frequency component of the coil driving voltage 127 denoted by the black square (■), consists of a fundamental frequency component and odd multiple components of the fundamental wave can be obtained from the Fourier transform of a general square wave.

As described in the description of FIGS. 5A and 5B, the coil driving voltage 125 denoted by the white triangle (A) can reduce the frequency component of fundamental wave as compared with the coil driving voltage 127 denoted by the black square (■). Further, it is understood that the coil driving voltage 125 includes an even multiple component of the frequency of fundamental wave which is not included in the coil driving voltage 127 in addition to the odd multiple component of the frequency of fundamental wave. Further, it is understood that the odd multiple component of the frequency of fundamental wave in the coil driving voltage 125 is slightly increased or decreased as compared with the odd multiple component of the frequency of fundamental wave in the coil driving voltage 127. This is because the coil driving voltage 125 has two pulses in one cycle as illustrated in FIG. 3A. Specifically, since the coil driving voltage 125 has two pulses in one cycle, the frequency component of the waveform is dispersed to a higher frequency component than the coil driving voltage 127 illustrated in FIG. 3B. As described above, by dispersing a part of the largest voltage level of the waveform to a higher frequency component when viewed for each frequency, it is possible to reduce a magnetic field noise component that affects image disturbance of an image captured by the imaging element 211.

In the present embodiment, the modulation pulse 123 and the fixed pulse 124 are set such that the pulse width of the ON time of the fixed pulse 124 is within the pulse width of the ON time of the modulation pulse 123, but the present invention is not limited thereto. Preferably, the modulation pulse 123 and the fixed pulse 124 can be set such that the timing at the center of the pulse of the modulation pulse 123 is within the pulse width of the fixed pulse 124. By setting the modulation pulse 123 and the fixed pulse 124 in this manner, the pulse widths of the period 130B1 and the period 130B2 become closer to each other, and a higher frequency dispersion effect can be obtained. More preferably, the modulation pulse 123 and the fixed pulse 124 can be set such that the timing at the center of the pulse of the modulation pulse 123 and the timing at the center of the pulse of the fixed pulse 124 are synchronized, that is, such that both timings overlap. By setting the modulation pulse 123 and the fixed pulse 124 in this manner, the period 130B1 and the period 130B2 become substantially the same period, and as a result, a higher frequency dispersion effect can be obtained. The driving circuit 110 can set the modulation pulse 123 and the fixed pulse 124 by the first duty ratio setting unit 116, the second duty ratio setting unit 117, and the phase difference setting unit 118.

Figure 7:
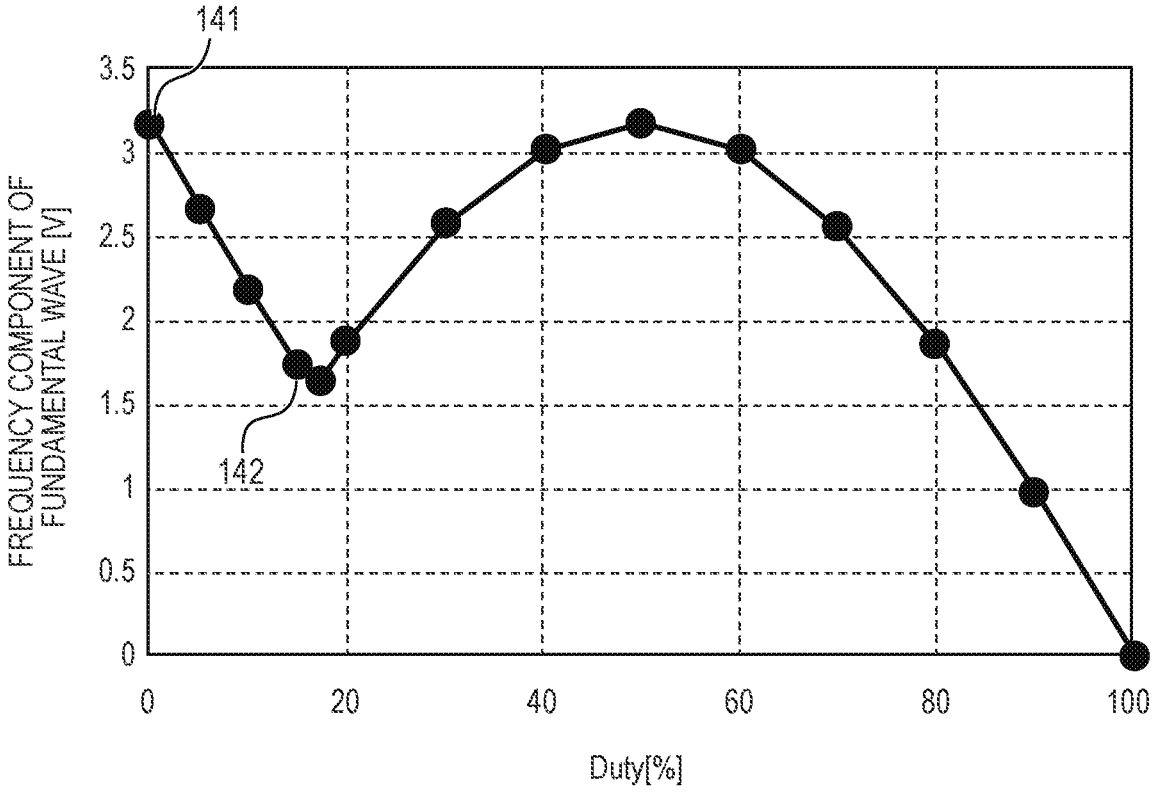
FIG. 7 is a graph illustrating a relationship between a fixed pulse width of a coil driving voltage and a maximum value of frequency component of fundamental wave of a waveform by the actuator driving device according to the first embodiment.

As described above, in the present embodiment, by forming two pulses in one cycle in the waveform of the coil driving voltage 125, magnetic field noise is dispersed to a high frequency component, and magnetic field noise causing image disturbance of an image captured by the imaging element 211 is reduced. At this time, the magnetic noise reduction effect also changes depending on the pulse width of the period 130C which is the off period provided between the two pulses. This point will be described with reference to FIG. 7. In FIG. 7, the horizontal axis indicates the Duty [%], which is a ratio of the pulse width of the period 130C to one cycle of the PWM signal in the coil driving voltage 125. The vertical axis indicates the maximum voltage value of the frequency component of fundamental wave obtained when the Duty of the period 130C is changed with respect to the waveform having each period 130C. For example, when the Duty of the period 130C is 0 [%], the coil driving voltage 125 generally has a waveform of a PWM signal as illustrated in FIG. 3B.

As can be seen from FIG. 7, the voltage level of the frequency component of fundamental wave of the coil driving voltage 125 can be reduced by increasing the Duty of the period 130C in a period in which the Duty of the period 130C is 0 to 17 [%]. On the other hand, when the Duty of the period 130C is in the range of 17 to 50 [%], the voltage level of the frequency component of fundamental wave of the coil driving voltage 125 increases as the Duty of the period 130C increases. This is because since the PWM signal is a repetitive waveform, a waveform having a large frequency component of fundamental wave is formed by combining the waveform of the first cycle and the waveform of the second cycle adjacent to the first period.

As illustrated in FIG. 7, according to the present embodiment, the voltage level of the frequency component of fundamental wave can be reduced as compared with the conventional general waveform even in a period in which the Duty of the period 130C is 17 to 50 [%]. When the Duty of the period 130C is greater than or equal to 50%, since the pulse width of the period 130C is as large as half or more of one cycle, the voltage level of the frequency component of fundamental wave is also reduced by increasing the period 130C. More specifically, since the maximum pulse width at which the composite waveform obtained by combining waveforms of adjacent cycles can be output decreases with the increase of the period 130C, the voltage level of the frequency component of fundamental wave of the composite waveform decreases.

As described above, according to the present embodiment, the voltage level of the frequency component of fundamental wave of the coil driving voltage 125 can be reduced even in consideration of the combination with the adjacent signal due to the repetition of the PWM signal. Since the period 130C is an OFF period of the coil driving voltage 125, the maximum torque that can be output from the actuator 200 decreases as the period 130C increases. Therefore, considering the maximum torque of the actuator 200, the pulse width of the fixed pulse 124 forming the period 130C or the period 130C is preferably smaller. The pulse width of the fixed pulse 124 is more preferably within 4 to 35% of the Duty. The driving circuit 110 can control the first driving voltage 121 and the second driving voltage 122 such that these preferred conditions are satisfied. With such a configuration, the voltage level of the frequency component of fundamental wave of the coil driving voltage 125 can be reduced by at least 10% or more while maintaining the driving force of the actuator 200.

As described above, according to the present embodiment, by forming the coil driving voltage 125 by the modulation pulse 123 and the fixed pulse 124, two pulses are formed in one cycle of the PWM signal in the coil driving voltage 125. By forming the coil driving voltage 125 in this manner, the magnetic field noise generated from the driving coil 111 can be dispersed to a higher frequency component, and image disturbance generated in an image captured by the imaging element 211 can be reduced.

In the present embodiment, the case where the pulse width of the fixed pulse 124 is fixed to be constant has been described, but the present invention is not limited thereto. The pulse width of the fixed pulse 124 may vary within an operating range of the actuator 200. For example, the pulse width of the pulse corresponding to the fixed pulse 124 may be configured to be varied with a small variation width with respect to the modulation pulse 123. In this case, the driving circuit 110 modulates the pulse width of the modulation pulse 123 with a change amount larger than the change amount of the pulse width of the small variation pulse. Thus, a pulse having a relatively small variation width with respect to the modulation pulse 123, which corresponds to the fixed pulse 124, can be referred to as a small variation pulse. The fixed pulse 124 is an example of the small variation pulse. The small variation pulse may be a modulation pulse capable of modulating a pulse width. Note that the change amount here is an absolute value. The change amount can be rephrased as a variation width. The variation width of the small variation pulse is preferably sufficiently smaller than the variation width of the modulation pulse 123. As the sufficiently small variation width, the change amount of the pulse width of the fixed pulse 124 can be set to be preferably within ±4%, more preferably within ±2% of the duty ratio serving as a reference of the pulse width of the fixed pulse 124. Specifically, as a sufficiently small variation width, the Duty that does not impair the performance of the shake correction mechanism that suppresses the shake of the captured image may be within ±4%. Further, the Duty may be set to ±2% in order to take full advantage of the linearity of the driver IC used for driving control of the motor or the like. If the variation width of the small variation pulse is within ±1%, it may be regarded as a fixed pulse. The variation width and the variation amount of the small variation pulse or the fixed pulse are preferably zero.

The configuration of the shake correction mechanism in which the actuator 200 driven by the actuator driving device 100 according to the present embodiment is used and the configuration related to the shake correction mechanism is not particularly limited, and various configurations can be adopted. For example, a conductive shielding member may be provided between the imaging element 211 and the driving coil 111. With this configuration, a higher magnetic noise reduction effect can be obtained. In this case, it is desirable that the conductive shielding member has a thickness equal to or greater than the skin thickness in order to enhance the shielding effect or the conductive shielding member has conductivity, but the shielding effect can also be enhanced by reducing the skin thickness by increasing the frequency of the noise to be shielded. According to the present embodiment, since the magnetic field noise generated from the driving coil 111 is dispersed to a higher frequency component, the shielding effect by the conductive shielding member can also be enhanced. The conductive shield member is preferably a non-magnetic conductor, and for example, magnesium alloy, aluminum, copper, or the like can be used.

Second Embodiment

Figure 8:
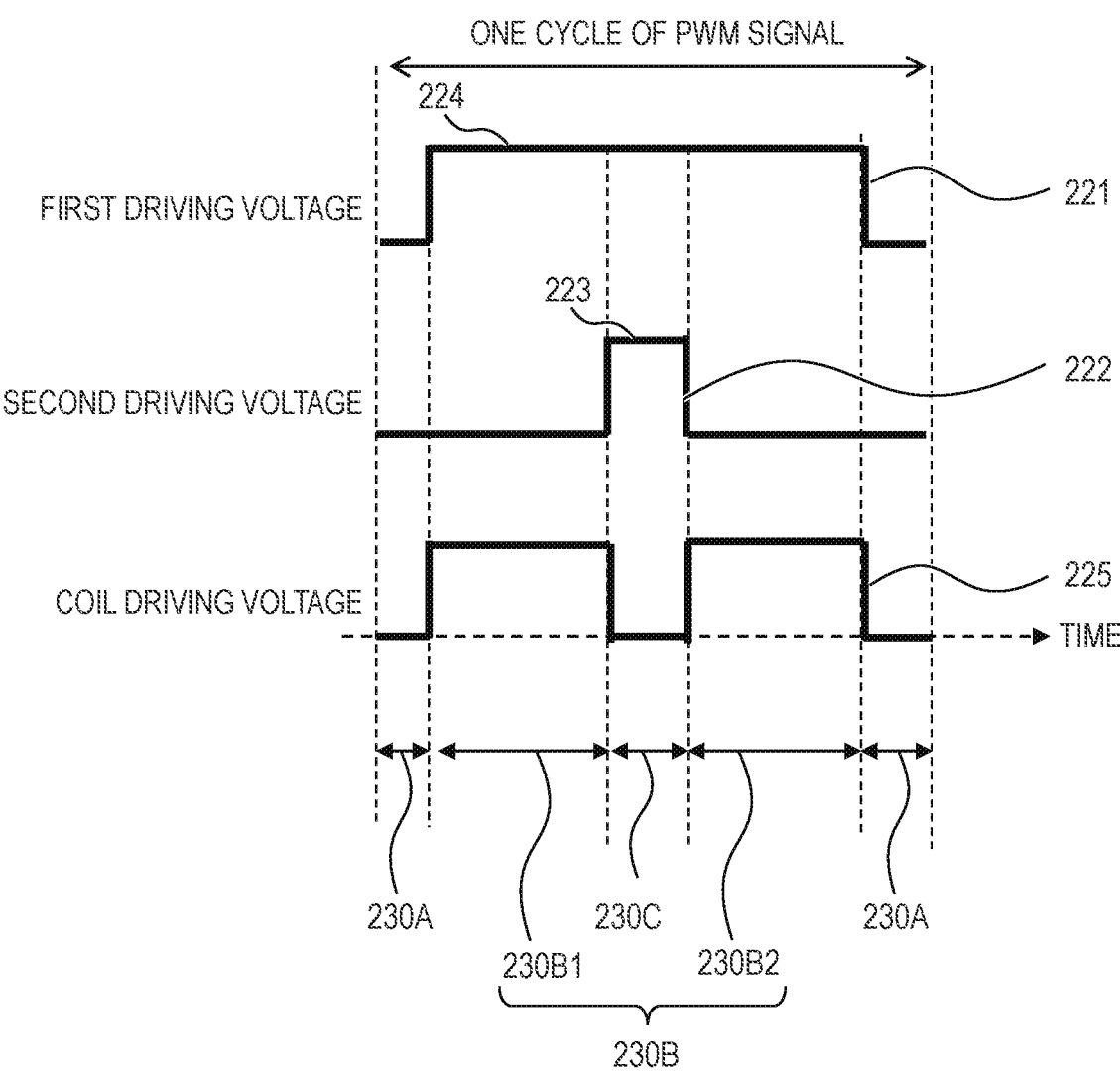
FIG. 8 is a diagram illustrating a coil driving voltage by the actuator driving device according to a second embodiment.

An actuator driving device and a control method thereof according to a second embodiment of the present invention will be described with reference to FIG. 8. FIG. 8 is a diagram illustrating a coil driving voltage by the actuator driving device according to the present embodiment.

Since the basic configuration of the actuator driving device according to the present embodiment is the same as the configuration illustrated in the first embodiment, the description thereof will be omitted. The present embodiment is different from the first embodiment in the relationship between the pulse width and timing of the modulation pulse 223 and the fixed pulse 224 in the coil driving voltage 225. Hereinafter, a coil driving voltage 225 for driving the actuator 200 by the actuator driving device 100 according to the present embodiment will be described with reference to FIG. 8. FIG. 8 illustrates a coil driving voltage 225 when a fixed pulse 224 is applied to the first driving voltage 221 and a modulation pulse 223 is applied to the second driving voltage 222 in the actuator driving device 100 according to the present embodiment.

Also in the present embodiment, similarly to the first embodiment, the driving circuit 110 causes the first output unit 114 to apply a binary voltage of ON and OFF as the first driving voltage 221 to the first input terminal 112. In addition, the driving circuit 110 causes the second output unit 115 to apply a binary voltage of ON and OFF as the second driving voltage 222 to the second input terminal 113. The driving circuit 110 can modulate a pulse width corresponding to the time during which the voltage is ON. The coil driving voltage 225 becomes a potential difference generated across the driving coil 111 and becomes a difference between the first driving voltage 221 and the second driving voltage 222. Thus, the pulse width corresponding to the ON time can be modulated in the present embodiment as well. Accordingly, the coil driving voltage 225 includes a period 230A, a period 230B, and a period 230C in which the ON/OFF states of the first driving voltage 221 and the second driving voltage 222 are different from each other in one cycle of the PWM signal.

The period 230A is a period in which the first driving voltage 221 is OFF and the second driving voltage 222 is OFF. The period 230B is a period in which the first driving voltage 221 is ON and the second driving voltage 222 is OFF. The period 230C is a period in which the first driving voltage 221 is ON and the second driving voltage 222 is ON.

The driving circuit 110 controls the modulation pulse 223 and the fixed pulse 224 such that the pulse width of the ON time of the modulation pulse 223 is within the pulse width of the ON time of the fixed pulse 224. Therefore, the period 230C in which the first driving voltage 221 is ON and the second driving voltage 222 is also ON is equivalent to the pulse width of the modulation pulse 223. In one cycle of the PWM signal, the period 230B is composed of two periods, that is, a period 230B1 and a period 230B2 which are positioned so as to sandwich the period 230C before and after the period 230C in a time series. Thus, also in the present embodiment, the driving circuit 110 controls the coil driving voltage 225 so as to be a waveform having two pulses during one cycle of the PWM signal by combining the modulation pulse 223 and the fixed pulse 224.

As described above, according to the present embodiment, by forming the coil driving voltage 225 with the modulation pulse 223 and the fixed pulse 224, two pulses are formed in one cycle of the PWM signal in the coil driving voltage 225. By forming the coil driving voltage 225 in this manner, the magnetic field noise generated from the driving coil 111 can be dispersed to a higher frequency component, and image disturbance generated in an image captured by the imaging element 211 can be reduced.

In the present embodiment, the modulation pulse 223 and the fixed pulse 224 are set such that the pulse width of the ON time of the modulation pulse 223 is within the pulse width of the ON time of the fixed pulse 224, but the present invention is not limited thereto. Preferably, the modulation pulse 223 and the fixed pulse 224 can be set such that the timing at the center of the pulse of the fixed pulse 224 is within the pulse width of the modulation pulse 223. By setting the modulation pulse 223 and the fixed pulse 224 in this manner, the pulse widths of the period 230B1 and the period 230B2 become closer to each other, and a higher frequency dispersion effect can be obtained. More preferably, the modulation pulse 223 and the fixed pulse 224 can be set such that the timing at the center of the pulse of the fixed pulse 224 and the timing at the center of the pulse of the modulation pulse 223 are synchronized, that is, such that both timings overlap. By setting the modulation pulse 223 and the fixed pulse 224 in this manner, the period 230B1 and the period 230B2 become substantially the same period, and as a result, a higher frequency dispersion effect can be obtained.

Also in the present embodiment, the driving circuit 110 can be configured to have a function of switching the modulation pulse 223 and the fixed pulse 224 set as the first driving voltage 221 and the second driving voltage 222. The driving circuit 110 can perform these switching at the timing when the pulse width of the modulation pulse 223 and the pulse width of the fixed pulse 224 become equal. Specifically, for example, the driving circuit 110 can perform these switching at the timing when the pulse width of the modulation pulse 223 becomes large and becomes equal to the pulse width of the fixed pulse 224.

Also in the present embodiment, similarly to the first embodiment, the first control and the second control can be switched. In the present embodiment, for example, in the first control, the first driving voltage 221 is a fixed pulse 224, the second driving voltage 222 is a modulation pulse 223, and in the second control, the first driving voltage 221 is a modulation pulse 223, and the second driving voltage 222 is a fixed pulse 224. In this case, as the first control, the driving circuit 110 modulates the pulse width of the second driving voltage 222 with a change amount larger than the change amount of the pulse width of the first driving voltage 221 such that the pulse width of the ON time of the second driving voltage 222 is within the pulse width of the ON time of the first driving voltage 221. Further, as the second control, the driving circuit 110 modulates the pulse width of the first driving voltage 221 with a change amount larger than the change amount of the pulse width of the second driving voltage 222 such that the pulse width of the first driving voltage 221 in the ON time is within the pulse width of the second driving voltage 222 in the ON time.

Also in the present embodiment, as in the first embodiment, a modulation pulse capable of modulating the pulse width can be used instead of the fixed pulse 224. For example, the pulse width of the fixed pulse 224 may be configured to be varied with a sufficiently small variation width with respect to the modulation pulse 223. That is, the driving circuit 110 can modulate the pulse width of the modulation pulse 223 with a change amount larger than the change amount of the pulse width of the pulse whose pulse width changes instead of the fixed pulse 224.

Third Embodiment

Figure 9:
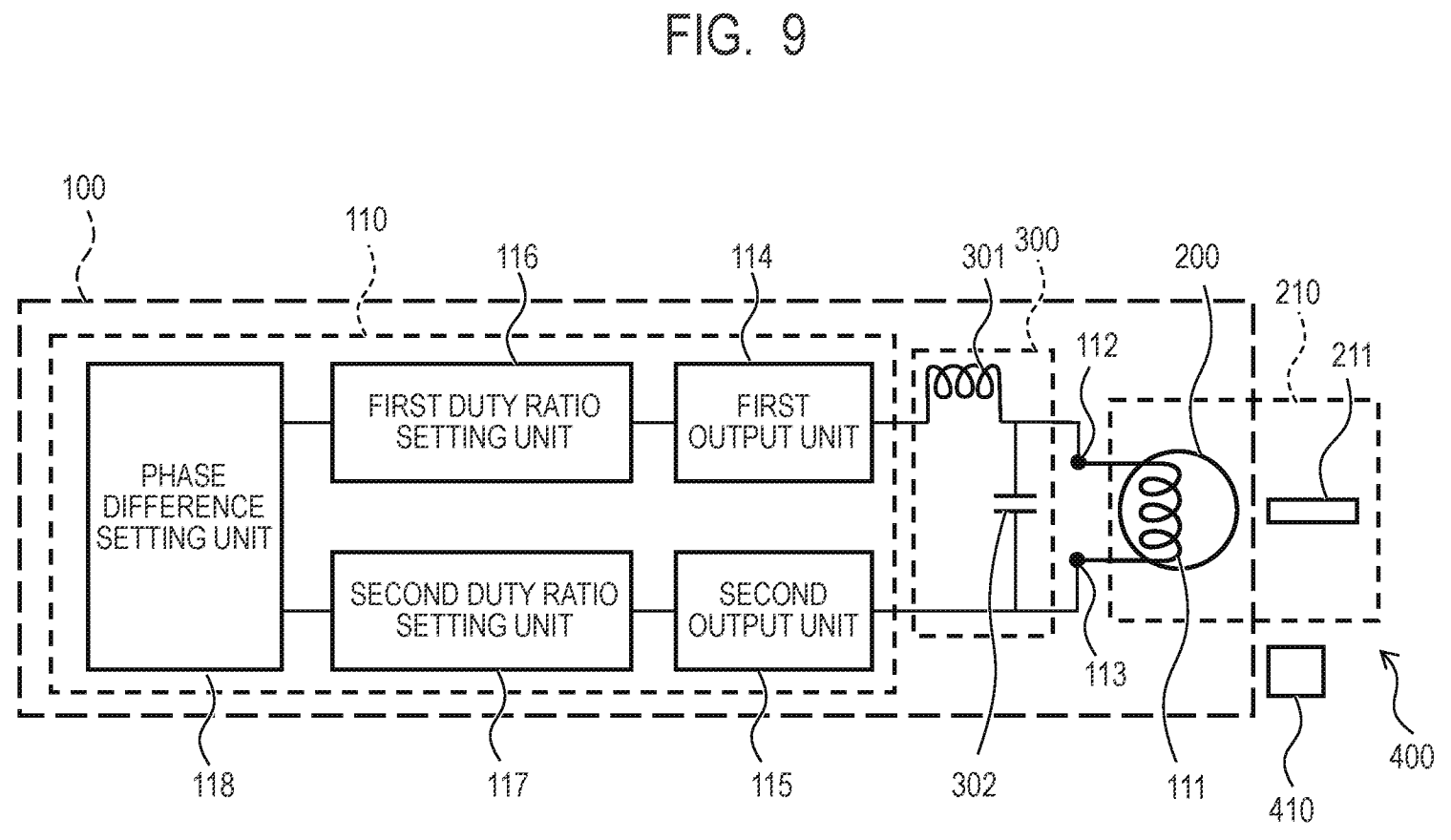

An actuator driving device and a control method thereof according to a third embodiment of the present invention will be described with reference to FIG. 9. FIG. 9 is a schematic diagram illustrating the actuator driving device 100 according to the present embodiment.

Since the basic configuration of the actuator driving device according to the present embodiment is the same as the configuration illustrated in the first embodiment, the description thereof will be omitted. The present embodiment is different from the first embodiment in that the actuator driving device 100 includes a filter circuit 300 between the driving circuit 110 and the driving coil 111. Hereinafter, the actuator driving device 100 according to the present embodiment will be described with reference to FIG. 9.

As illustrated in FIG. 9, the actuator driving device 100 according to the present embodiment includes the filter circuit 300 in addition to the configuration illustrated in FIG. 1. The filter circuit 300 is provided between the driving circuit 110 and the driving coil 111.

The filter circuit 300 has an inductor 301 and a capacitor 302, and is a so-called low-pass filter circuit composed of them. The inductor 301 is provided between the first output unit 114 and the first input terminal 112 connected to each other. The capacitor 302 is provided to connect one point between the inductor 301 and the first input terminal 112 connected to each other and one point between the second output unit 115 and the second input terminal 113 connected to each other.

The first output unit 114 outputs one of the modulation pulse 123 and the fixed pulse 124 as a first driving voltage 121 to the first input terminal 112 via the filter circuit 300. The second output unit 115 outputs the other of the modulation pulse 123 and the fixed pulse 124 to the second input terminal 113 as the second driving voltage 122 via the filter circuit 300. Thus, the driving circuit 110 can apply the coil driving voltage 125 to the driving coil 111 via the filter circuit 300.

As described above, in the present embodiment, since the filter circuit 300 is provided, the modulation pulse 123 and the fixed pulse 124 output from the driving circuit 110 are applied to the driving coil 111 via the filter circuit 300. Since the filter circuit 300 is used, a frequency component higher than the cutoff frequency of the signal applied to the driving coil 111 is reduced. Thus, magnetic noise generated from the driving coil 111 can be reduced.

However, since the inductor 301 constituting a part of the low-pass filter circuit also has a winding structure, a magnetic field is generated from the inductor 301 by a current flowing through the inductor 301. When the magnetic field reaches the imaging element 211, magnetic noise is generated in the image signal or video signal of the imaging element 211 to cause image disturbance in the image captured by the imaging element 211.

On the other hand, in the present embodiment, by forming the coil driving voltage 125 with the modulation pulse 123 and the fixed pulse 124, two pulses are formed in one cycle of the PWM signal in the waveform of the coil driving voltage 125. Thus, the magnetic field noise generated from the driving coil 111 can be dispersed to a higher frequency component, and image disturbance generated in an image captured by the imaging element 211 can be reduced. Therefore, in the present embodiment, even the magnetic field noise generated from the inductor 301 constituting a part of the filter circuit 300 has an effect of dispersing to higher frequency components.

In the present embodiment, a signal applied to the driving coil 111 is transmitted through the filter circuit 300. Therefore, in the present embodiment, in addition to the dispersion of the signal component, which causes the magnetic field noise by the coil driving voltage 125 according to the present embodiment, to the high frequency component, the effect of reducing the high frequency component by the filter circuit 300 can be obtained. When the frequency of the filter circuit 300 is a frequency having a high reduction effect, the propagation of more noise signals can be blocked. Therefore, according to the present embodiment, the filter effect of the filter circuit 300 can be further increased.

As described above, according to the present embodiment, by forming the coil driving voltage 125 with the modulation pulse 123 and the fixed pulse 124, two pulses are formed in one cycle of the PWM signal in the coil driving voltage 125. By forming the coil driving voltage 125 in this manner, the magnetic field noise generated from the inductor 301 constituting a part of the filter circuit 300 can be dispersed to a higher frequency component, and image disturbance generated in an image captured by the imaging element 211 can be reduced.

Further, according to the present embodiment, since the noise component of the signal output to the inductor 301 is dispersed to a higher frequency component, the filter effect of the filter circuit 300 can be increased. As a result, noise components propagating to the driving coil 111 can be reduced, and image disturbance occurring in an image captured by the imaging element 211 can be reduced.

In the present embodiment, the case where the filter circuit 300 is further provided in the actuator driving device 100 according to the first embodiment has been described, but the present invention is not limited thereto. When the filter circuit 300 is further provided in the actuator driving device 100, the coil driving voltage 125 may be formed as in the first embodiment, or the coil driving voltage 225 may be formed as in the second embodiment.

Other Embodiments

Some of the embodiments described above may be omitted. For example, the driving circuit 110 may perform only one of the first control and the second control described above. That is, the driving circuit 110 may perform at least one of the first control and the second control. Further, a plurality of embodiments described above can be combined. For example, the driving circuit 110 may be configured to be able to execute both the driving mode based on the first embodiment and the driving mode based on the second embodiment, and may be configured to be able to select the driving mode to be executed in response to a request.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, magnetic field noise can be reduced with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-163319, filed Oct. 11, 2022, which is hereby incorporated by reference herein in its entirety.

What is claimed is:

1. An actuator driving device comprising:
a driving coil that has a first input terminal to which a first voltage is applied and a second input terminal to which a second voltage is applied, and generates a driving force for driving an actuator by applying the first voltage and the second voltage; and
a control unit that controls the first voltage and the second voltage,
wherein the control unit sets one of the first voltage and the second voltage to a first pulse, sets the other one of the first voltage and the second voltage to a second pulse, and performs the following:
a first control for modulating a pulse width of one of the first pulse and the second pulse with a change amount of pulse width of the one of the first pulse and the second pulse so that a pulse width of the ON time of the second pulse is within a pulse width of the ON time of the first pulse, the change amount of pulse width of the one of the first pulse and the second pulse being larger than a change amount of pulse width of the other one of the first pulse and the second pulse in the first control; and
a second control for modulating a pulse width of one of the first pulse and the second pulse with a change amount of pulse width of the one of the first pulse and the second pulse so that the pulse width of the first pulse in the ON time is within the pulse width of the second pulse in the ON time, the change amount of pulse width of the one of the first pulse and the second pulse being larger than a change amount of pulse width of the other one of the first pulse and the second pulse in the second control,
wherein the control unit switches between the first control and the second control.

2. The actuator driving device according to claim 1, wherein, in the first control, a change amount of the pulse width of the second pulse is within ±4% of a duty ratio as a reference of the pulse width of the second pulse.

3. The actuator driving device according to claim 2, wherein, in the second control, a change amount of the pulse width of the first pulse is within ±4% of a duty ratio as a reference of the pulse width of the first pulse.

4. The actuator driving device according to claim 3, wherein, in the second control, the first pulse is a fixed pulse.

5. The actuator driving device according to claim 2, wherein, in the first control, the second pulse is a fixed pulse.

6. The actuator driving device according to claim 1, wherein, at a timing when the control unit switches between the first control and the second control, the control unit sets the duty ratio of pulse widths of the first pulse and the second pulse within 4 to 35%.

7. The actuator driving device according to claim 1, wherein the control unit sets a duty ratio of a pulse width of the second pulse within 4 to 35% in the first control.

8. The actuator driving device according to claim 1, wherein, in at least one of the first control and the second control, the control unit sets the first pulse and the second pulse such that a center timing of the first pulse and a center timing of the second pulse overlap with each other.

9. The actuator driving device according to claim 1, wherein the control unit can switch between the first pulse and the second pulse that are set to the first voltage and the second voltage.

10. The actuator driving device according to claim 9, wherein the control unit switches the first pulse and the second pulse to each other at a timing when the pulse width of the first pulse and the pulse width of the second pulse are equal.

11. The actuator driving device according to claim 1, further comprising:
a first output unit that outputs the first voltage applied to the first input terminal; and
a second output unit that outputs the second voltage applied to the second input terminal.

12. A device comprising:
the actuator driving device according to claim 1; and
an element;
wherein the actuator is configured to be capable of moving the element.

13. A device comprising:
the actuator driving device according to claim 1; and
an imaging element,
wherein the actuator is configured to be capable of moving the imaging element.

14. An actuator driving device comprising:
a driving coil that has a first input terminal to which a first voltage is applied and a second input terminal to which a second voltage is applied, and generates a driving force for driving an actuator by applying the first voltage and the second voltage; and
a control unit that controls the first voltage and the second voltage,
wherein the control unit sets one of the first voltage and the second voltage to a first pulse, sets the other one of the first voltage and the second voltage to a second pulse, and performs at least one of the following:
a first control for modulating a pulse width of one of the first pulse and the second pulse with a change amount of pulse width of the one of the first pulse and the second pulse so that a pulse width of the ON time of the second pulse is within a pulse width of the ON time of the first pulse, the change amount of pulse width of the one of the first pulse and the second pulse being larger than a change amount of pulse width of the other one of the first pulse and the second pulse in the first control; and
a second control for modulating a pulse width of one of the first pulse and the second pulse with a change amount of pulse width of the one of the first pulse and the second pulse so that the pulse width of the first pulse in the ON time is within the pulse width of the second pulse in the ON time, the change amount of pulse width of the one of the first pulse and the second pulse being larger than a change amount of pulse width of the other one of the first pulse and the second pulse in the second control,
wherein the control unit sets, in the first control, the first pulse and the second pulse such that a timing of a center of a pulse of the first pulse is within the pulse width of the second pulse, and
wherein the control unit sets, in the second control, the first pulse and the second pulse such that a timing of a center of a pulse of the second pulse is within a pulse width of the first pulse.

15. The actuator driving device according to claim 14, wherein the control unit switches between the first control and the second control.

16. A device comprising:
the actuator driving device according to claim 14; and
an element;
wherein the actuator is configured to be capable of moving the element.

17. An actuator driving device comprising:
a driving coil that has a first input terminal to which a first voltage is applied and a second input terminal to which a second voltage is applied, and generates a driving force for driving an actuator by applying the first voltage and the second voltage; and
a control unit that controls the first voltage and the second voltage,
wherein the control unit sets one of the first voltage and the second voltage to a first pulse, sets the other one of the first voltage and the second voltage to a second pulse, and performs at least one of the following:
a first control for modulating a pulse width of one of the first pulse and the second pulse with a change amount of pulse width of the one of the first pulse and the second pulse so that a pulse width of the ON time of the second pulse is within a pulse width of the ON time of the first pulse, the change amount of pulse width of the one of the first pulse and the second pulse being larger than a change amount of pulse width of the other one of the first pulse and the second pulse in the first control; and
a second control for modulating a pulse width of one of the first pulse and the second pulse with a change amount of pulse width of the one of the first pulse and the second pulse so that the pulse width of the first pulse in the ON time is within the pulse width of the second pulse in the ON time, the change amount of pulse width of the one of the first pulse and the second pulse being larger than a change amount of pulse width of the other one of the first pulse and the second pulse in the second control;
a first output unit that outputs the first voltage applied to the first input terminal;
a second output unit that outputs the second voltage applied to the second input terminal; and a filter circuit,
  wherein the first output unit outputs the first voltage to the first input terminal via the filter circuit, and
  wherein second output unit outputs the second voltage to the second input terminal via the filter circuit.

18. The actuator driving device according to claim 17, wherein the filter circuit is a circuit having an inductor.

19. The actuator driving device according to claim 17, further comprising:
  a first duty ratio setting unit that sets a duty ratio of the first voltage output from the first output unit; and
  a second duty ratio setting unit that sets a duty ratio of the second voltage output from the second output unit.

20. The actuator driving device according to claim 17, further comprising a phase difference setting unit that sets a phase difference between the first voltage output from the first output unit and the second voltage output from the second output unit.

21. A method of controlling an actuator driving device that has a driving coil for having a first input terminal to which a first voltage is applied and a second input terminal to which a second voltage is applied and generating a driving force for driving an actuator by applying the first voltage and the second voltage, the method comprising:

setting one of the first voltage and the second voltage to a first pulse and the other of the first voltage and the second voltage to a second pulse; and
switching between the following:
a first control for modulating a pulse width of one of the first pulse and the second pulse with a change amount of pulse width of the one of the first pulse and the second pulse so that a pulse width of the ON time of the second pulse is within a pulse width of the ON time of the first pulse, the change amount of pulse width of the one of the first pulse and the second pulse being larger than a change amount of pulse width of the other one of the first pulse and the second pulse in the first control; and
a second control for modulating a pulse width of one of the first pulse and the second pulse with a change amount of the one of the first pulse and the second pulse so that the pulse width of the first pulse in the ON time is within the pulse width of the second pulse in the ON time, the change amount of pulse width of the one of the first pulse and the second pulse being larger than a change amount of pulse width of the other one of the first pulse and the second pulse in the second control.

* * * * *